(12) United States Patent
Makhervaks et al.

(10) Patent No.: US 9,405,725 B2
(45) Date of Patent: Aug. 2, 2016

(54) WRITING MESSAGE TO CONTROLLER MEMORY SPACE

(75) Inventors: Vadim Makhervaks, Austin, TX (US); Robert O. Sharp, Round Rock, TX (US); Kenneth G. Keels, Georgetown, TX (US); Brian S. Hausauer, Austin, TX (US); Steen K. Larsen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/993,697

(22) PCT Filed: Sep. 29, 2011

(86) PCT No.: PCT/US2011/053988
§ 371 (c)(1),
(2), (4) Date: Jun. 13, 2013

(87) PCT Pub. No.: WO2013/048409
PCT Pub. Date: Apr. 4, 2013

(65) Prior Publication Data
US 2013/0262614 A1 Oct. 3, 2013

(51) Int. Cl.
*G06F 15/167* (2006.01)
*G06F 15/173* (2006.01)
*G06F 5/14* (2006.01)
*G06F 9/54* (2006.01)

(52) U.S. Cl.
CPC ............ *G06F 15/17331* (2013.01); *G06F 5/14* (2013.01); *G06F 9/544* (2013.01)

(58) Field of Classification Search
CPC .......... G06F 13/14; G06F 12/00; G06F 12/14
USPC .................... 709/212, 210; 710/200
See application file for complete search history.

(56) References Cited

U.S. PATENT DOCUMENTS

| 6,571,276 B1 * | 5/2003 | Burns ............... G06F 17/30171 707/999.008 |
| 6,721,806 B2 * | 4/2004 | Boyd et al. .................... 719/312 |
| 6,747,949 B1 | 6/2004 | Futral |
| 6,847,968 B2 * | 1/2005 | Pitts .................. G06F 17/30067 |

(Continued)

FOREIGN PATENT DOCUMENTS

| CN | 101101586 A | 1/2008 |
| CN | 102255794 A | 11/2011 |

(Continued)

OTHER PUBLICATIONS

International Search Report and Written Opinion received for PCT Patent Application No. PCT/US2011/053988, mailed on May 4, 2012, 10 pages.

(Continued)

*Primary Examiner* — Philip B Tran
(74) *Attorney, Agent, or Firm* — Christopher K. Gagne

(57) ABSTRACT

An embodiment may include circuitry that may write a message from a system memory in a host to a memory space in an input/output (I/O) controller in the host. A host operating system may reside, at least in part, in the system memory. The message may include both data and at least one descriptor associated with the data. The data may be included in the at least one descriptor. The circuitry also may signal the I/O controller that the writing has occurred.

24 Claims, 6 Drawing Sheets

(56) References Cited

U.S. PATENT DOCUMENTS

| | | | |
|---|---|---|---|
| 7,171,495 B2* | 1/2007 | Matters et al. | 709/250 |
| 7,281,030 B1 | 10/2007 | Davis | |
| 7,664,900 B2* | 2/2010 | Hosomi | G06F 12/0808 710/200 |
| 7,680,988 B1* | 3/2010 | Nickolls | G06F 12/084 711/130 |
| 7,765,187 B2* | 7/2010 | Bergant | G06F 11/1435 707/614 |
| 7,809,875 B2* | 10/2010 | Sundaram et al. | 710/260 |
| 8,140,493 B2* | 3/2012 | Waddington | G06F 17/30477 707/694 |
| 8,655,930 B2* | 2/2014 | Beichter | G06F 17/30362 707/826 |
| 8,688,879 B2* | 4/2014 | Latta | G06F 9/3885 710/240 |
| 8,819,357 B2* | 8/2014 | Vilayannur | G06F 12/08 711/130 |
| 2003/0043794 A1* | 3/2003 | Cayton et al. | 370/386 |
| 2005/0044162 A1* | 2/2005 | Liang | G06F 17/30067 709/212 |
| 2006/0048162 A1* | 3/2006 | Boult | 719/310 |
| 2006/0136677 A1* | 6/2006 | Fuhs | G06F 12/0831 711/147 |
| 2006/0236063 A1* | 10/2006 | Hausauer et al. | 711/170 |
| 2008/0120441 A1* | 5/2008 | Loewenstein | G06F 12/0815 710/22 |
| 2008/0244134 A1 | 10/2008 | Hosomi | |
| 2008/0320459 A1* | 12/2008 | Morris | G06F 9/526 717/162 |
| 2009/0210584 A1* | 8/2009 | Carlson et al. | 710/36 |
| 2010/0070658 A1* | 3/2010 | Chiang et al. | 710/13 |
| 2011/0145474 A1* | 6/2011 | Intrater | 711/103 |
| 2013/0041969 A1* | 2/2013 | Falco et al. | 709/212 |

FOREIGN PATENT DOCUMENTS

| | | |
|---|---|---|
| WO | 2013/048409 A1 | 4/2013 |
| WO | WO-2013/048409 A1 * | 4/2013 ............ G06F 13/16 |

OTHER PUBLICATIONS

Intel, "Write Combining Memory Implementation Guidelines", Order No. 244422-001, Nov. 1998, 17 pages.

Intel® Developer Zone, "Write-Combining Store Buffers on Hyper-Threading Technology-Enabled Systems", Categories: Parallel Computing, Tags: Hyper-Threading, Multi-thread apps for Multi-Core, Submitted 2010, pp. 1-2.

International Preliminary Report on Patentability and Written Opinion received for PCT Patent Application No. PCT/US2011/053988, mailed on Apr. 10, 2014, 7 pages.

Office Action in Chinese Patent Application No. 201180073803.4, dated Sep. 25, 2015 (11 pages, with 5 pages summarized English translation).

* cited by examiner

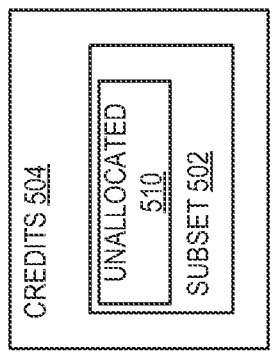
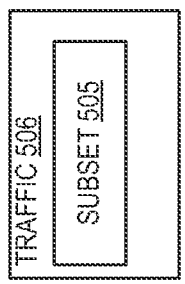
FIG. 5

WRITING MESSAGE TO CONTROLLER MEMORY SPACE

FIELD

This disclosure relates to writing a message to an input/output (I/O) controller memory space.

BACKGROUND

In one conventional computing arrangement, a client and a server include respective I/O controllers that are capable of communicating with each other using a Remote Direct Memory Access (RDMA) protocol. In order to transfer data from the server to the client, the data and a descriptor pointing to the data are both written to the server's main system memory. Thereafter, in response to a doorbell provided to the server's I/O controller, the server's I/O controller reads the descriptor. The server's I/O controller then reads the data pointed to by the descriptor. The server's I/O controller then transmits the data to the client. As can be appreciated, the latency involved in the data transfer from the server to the client increases with the number of main memory read operations carried out by the server's I/O controller.

In order to try to reduce the latency associated with the server main memory read operations, it has been proposed to place the data in line (e.g., in or near) the descriptor in the server's main system memory. However, even using this technique, the latency involved in carrying out the data transfer from the server to the client may remain greater than desirable.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 5 illustrates features in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
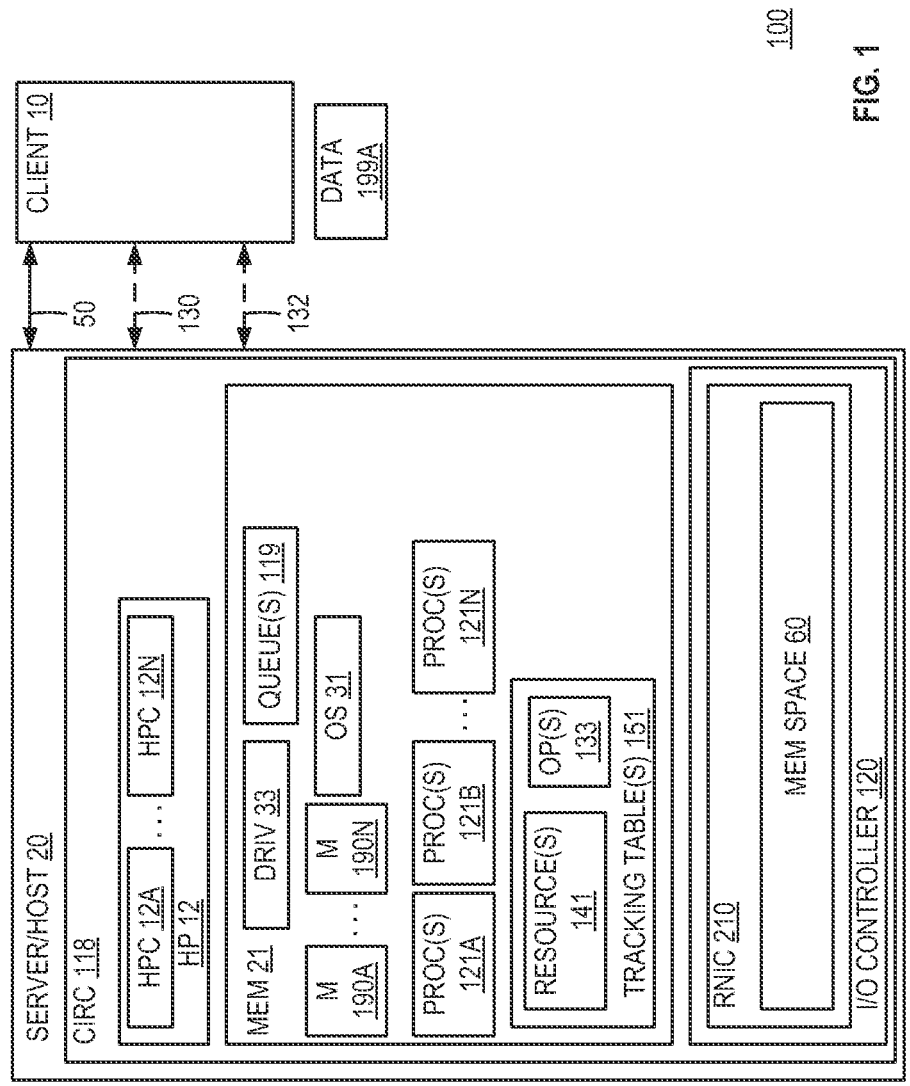
FIG. 1 illustrates features in an embodiment.

FIG. 1 illustrates a system embodiment 100. System 100 may include client 10 that is communicatively coupled, via network 50, to server 20. In this embodiment, the terms "host computer," "host," "server," "client," "network node," and "node" may be used interchangeably, and may mean, for example, without limitation, one or more end stations, mobile internet devices, smart phones, media devices, input/output I/O devices, tablet computers, appliances, intermediate stations, network interfaces, clients, servers, and/or portions thereof. Although client 10, server 20, and network 50 will be referred to in the singular, it should be understood that each such respective component may comprise one or more (e.g., a plurality) of such respective components without departing from this embodiment. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Host 20 may comprise circuitry 118 that may comprise one or more host processors (HP) 12, host main system memory 21, and/or I/O controller 120. One or more host processors 12 may be or comprise one or more multi-core host processors that may comprise a plurality of host processor core (HPC) central processing units (CPU) 12A . . . 12N. Although not shown in the Figures, server 20 also may comprise one or more chipsets (comprising, e.g., memory, network, and/or I/O controller circuitry). Controller 120 may comprise a remote direct memory access (RDMA) network interface controller (NIC) 210. Of course, without departing from this embodiment, controller 120 advantageously may (alternatively or additionally) be or comprise another type (e.g., storage and/or NIC) of controller (e.g., other than and/or in addition to an RDMA NIC). Controller 120 and/or RDMA NIC (RNIC) 210 may comprise, at least in part, memory space 60. Alternatively or additionally, memory space 60 may be associated with, at least in part, controller 120 and/or RNIC 210 (e.g., in such a manner as to be closely coupled to controller 120 and/or RNIC 210, at least in part). In this embodiment, a memory space may comprise one or more contiguous and/or non-contiguous locations in memory. In this exemplary embodiment, memory space 60 may be or comprise, for example, one or more memory mapped I/O (MMIO) spaces that may be accessible using the same or similar commands as those used to access memory 21, and/or that may comprise other and/or additional types of memory (e.g., uncacheable and/or write combining) as may be comprised in memory 21 (e.g., write back). In this embodiment, memory space 60 may comprise one or more controller address spaces that may be mapped to HP memory space. These one or more controller address spaces may be associated with a resource set that may be implemented and/or controllable via one or MMIO operations. The particular addresses that may be assigned to the resource set may be dynamically managed and/or allocated (e.g., during run time), and the resource set may not be allocated advertised to at least certain software entities or queues. Also in this embodiment, a location in memory may be or comprise one or more portions of the memory that are capable of being accessed, at least in part. In this embodiment, an access of a memory may comprise one or more reads of and/or writes to the memory. NIC 210, controller 120, HP 12, and/or HPC 12A . . . 12N may be capable of accessing memory 21 and/or of communicating with each other, via one or more such chipsets. In this embodiment, client 10 may be remote (e.g., geographically remote), at least in part, from host 20.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, HP, CPU, processor core (PC), HPC, core, and controller each may comprise respective circuitry capable of performing, at least in part, one or more arithmetic and/or logical operations, and/or of executing, at least in part, one or more instructions. Although not shown in the Figures, server 20 may comprise a graphical user interface system that may comprise, e.g., a respective keyboard, pointing device, and display system that may permit a human user to input commands to, and monitor the operation of, server 20 and/or system 100. Also in this embodiment, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

Figure 3:
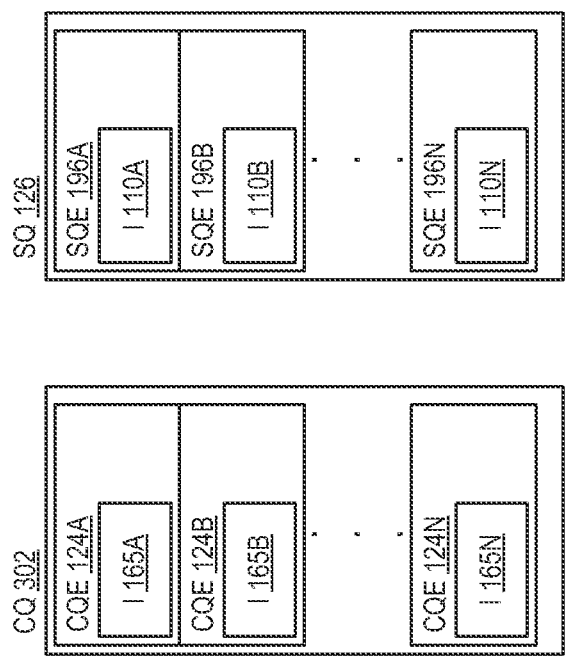
FIG. 3 illustrates features in an embodiment.

One or more machine-readable program instructions may be stored, at least in part, in memory 21. In operation of server 20, these machine-readable instructions may be accessed and executed by one or more host processors 12, one or more HPC 12A . . . 12N, controller 120, and/or NIC 210. When so executed, these one or more machine-readable instructions may result in one or more operating systems (OS) 31, one or more drivers 33, and/or one or more application processes 121A . . . 121N being executed at least in part by one or more HP 12 and/or HPC 12A . . . 12N, and also becoming resident at least in part in memory 21. Also when these machine-readable instructions are executed by one or more host processors 12, one or more HPC 12A . . . 12N, controller 120, and/or NIC 210, these one or more instructions may result, at least in part, in one or more of these components, one or more drivers 33, and/or one or more OS 31, establishing and/or maintaining, at least in part, one or more messages 190A . . . 190N, one or more queues 119, and/or one or more tracking tables 151 in memory 21, at least in part. In this embodiment, one or more queues 119 may comprise one or more completion queues (CQ) and/or one or more send queues (SQ) 126 (see FIG. 3). In this embodiment, a message may comprise one or more symbols and/or values, such as, for example, a descriptor to be written to un MMIO space. By way of example, in this embodiment, a message may be or comprise one or more structures written by one or more HPC to one or more I/O controller MMIO spaces. For example, in this embodiment, instead of being stored in memory 21, such a message may be instantiated as a result, at least in part, of being first stored in a not shown CPU register and directly written from the register into the I/O controller MMIO space.

In this embodiment, one or more drivers 33 may be mutually distinct from one or more OS 31, at least in part. Alternatively or additionally, without departing from this embodiment, one or more respective portions of one or more OS 31 and/or drivers 33 may not be mutually distinct, at least in part, from each other and/or may be comprised, at least in part, in each other. One or more OS 31 may facilitate, at least in part, execution and/or residence of one or more application processes 121A . . . 121N in memory 21. Likewise, without departing from this embodiment, I/O controller 120 and/or RNIC 210 may be distinct from (at least in part), or alternatively, may be comprised in at least in part) the one or more not shown chipsets and/or HP 12. Also without departing from this embodiment, one or more portions of memory 21 may be comprised in RNIC 210, controller 120, and/or HP 12.

In this embodiment, a portion or subset of an entity may comprise all or less than all of the entity. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions. In this embodiment, a driver may be, comprise and/or result from, at least in part, one or more kernel drivers and/or user space libraries.

In this embodiment, a queue, buffer, and/or doorbell may comprise one or more locations e.g., specified and/or indicated, at least in part, by one or more addresses) in memory in which data and/or one or more commands may be stored, at least temporarily. In this embodiment, a doorbell message may be or comprise data and/or one or more commands that may indicate, at least in part, one or more events, operations, occurrences, and/or transactions that have taken place, at least in part, and/or that are to take place, at least in part. Furthermore, in this embodiment, a queue element may be or comprise data and/or one or more commands to be stored and/or stored in one or more queues, such as, for example, one or more descriptors and/or one or more commands. Additionally, in this embodiment, a pointer may indicate, address, and/or specify, at least in part, one or more locations and/or one or more items in memory. Also, in this embodiment, a descriptor may comprise (1) data, and (2) one or more commands (e.g., one or more RDMA commands) and/or information associated, at least in part, with the data. Examples of descriptors in this embodiment may include send queue elements, scatter gather lists, scatter gather elements, and/or other structures, such as, for example, structures comprising commands, inline data, and/or referenced data.

In this embodiment, the construction and/or operation of host 20 and/or of the components thereof may be similar or identical, at least in part, to the construction and/or operation of client 10 and/or of the components of client 10. Alternatively, without departing from this embodiment, the construction and/or operation of host 20 and/or of the components thereof may differ, at least in part, from the construction and/or operation of client 10 and/or of the components of client 10.

I/O controller 120 and/or RNIC 210 may exchange data and/or commands with client 10 via one or more I/O operations (e.g., one or more I/O operations 130 and/or 132) via network 50. In this embodiment, this exchange and/or these one or more I/O operations may be in accordance with one or more protocols that may comply and/or be compatible with an RDMA (e.g., iWARP) protocol, Ethernet protocol, and/or Transmission Control Protocol/Internet Protocol (TCP/IP) protocol. For example, the RDMA protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Many different, additional, and/or other protocols may be used for such data and/or command exchange without departing from this embodiment (e.g., earlier and/or later-developed versions of the aforesaid, related, and/or other protocols).

Figure 2:
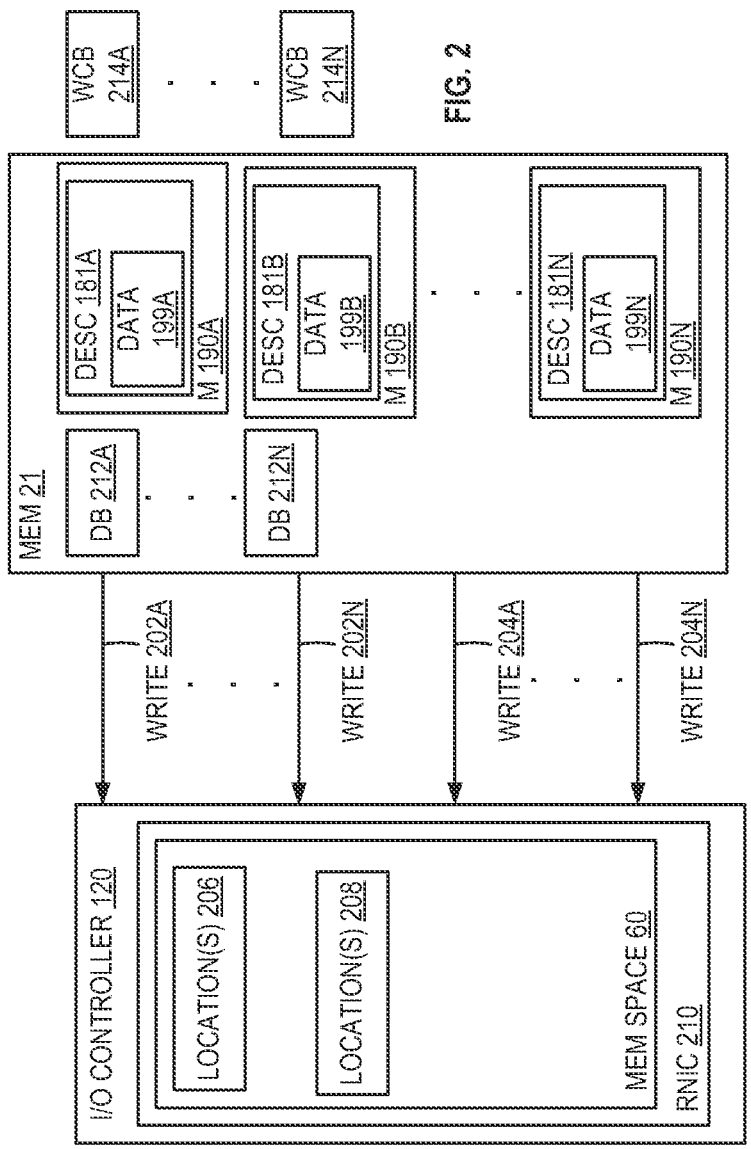
FIG. 2 illustrates features in an embodiment.

In operation, circuitry 118 (e.g., one or more HPC 12A and/or one or more drivers 33 executed by one or more HPC 12A) may execute one or more RDMA I/O operations 130 and/or 132 that may transmit and write data (e.g., data 199A) from controller 120 and/or RNIC 210 to memory (not shown) in client 10 in a manner that by-passes and/or is independent of the involvement of (1) OS 31 in host 20 and/or (2) a not shown OS that may reside and/or be executed in client 10. In order to facilitate, initiate, and/or carry out these one or more operations 130 and/or 132, circuitry 118 (e.g., one or more HPC 12A and/or one or more drivers 33 executed by one or more HPC 12A) may write one or more messages 190A from system memory 21 to memory space 60 in I/O controller 120 and/or RNIC 210. As shown in FIG. 2, one or more messages 190A may include both data 199A and one or more descriptors 181A. The data 199A may be included in the one or more descriptors 181A. After this writing of the one or more messages 190A to memory space 60 (or contemporaneously, at least in part, therewith), circuitry 118 (e.g., one or more HPC 12A and/or one or more drivers 33 executed by one or more HPC 12A) may signal the I/O controller 120 and/or RNIC 210 that this writing has occurred. In this embodiment, this signaling may be accomplished by and/or comprise any mechanism, such as, for example, the writing of one or more doorbell messages 212A to one or more locations 208 in memory space 60. In this embodiment, this signaling may be for the purpose of and/or may result in flushing of one or more write-combined buffers and/or may make data available to the I/O controller 120. In this embodiment, one or more locations 208 may be or comprise one or more doorbells associated, at least in part, with controller 120 and/or RNIC 210.

For example, in this embodiment, this writing of one or more messages 190A may be carried out using a single write operation 202A (e.g., involving one or more write-related transactions of a not shown host bus system in host 20) to write data involving (e.g., in this case, from) one or more write-combined buffers (WCB, e.g., WCB 214A) associated with and/or generated by, at least in part, one or more HPC 12A to one or more locations 206 in memory space 60. For example, WCB 214A may store, at least in part, data 199A that may be comprised in one or more messages 190A, and one or more messages 190A may be written to one or more locations 206 using write operation 202A. In this embodiment, a WCB may store, at least temporarily, data that may have been collected and/or combined, for example, for transmission via one or more burst mode transactions and/or bus operations.

Prior to the writing of one or more messages 190A to one or more locations 206, circuitry 118 (e.g., one or more HPC 12A and/or one or more drivers 33 executed by one or more HPC 12A) may write (see operation 602 in FIG. 6) one or more queue elements (QE, e.g., one or more send queue elements (SQE) 196A) to one or more queues (e.g., one or more SQ 126). The one or more SQE 196A may request, at least in part, the execution by controller 120 and/or RNIC 210 of one or more I/O operations 130, in the event of that (1) the I/O controller 120 and/or RNIC 210 discard, at least in part, the one or more messages 190A and/or (2) data 199A is to be re-transmitted from I/O controller 120 and/or RNIC 210 to client 10. In this embodiment, when written to one or more locations 206, the one or more messages 190A may request, at least in part, execution by controller 120 and/or RNIC 210 of one or more I/O operations 132 that may correspond and/or be identical (e.g., in substance and/or result), at least in part, to the one or more I/O operations 130 that may be requested, at least in part, by one or more SQE 196A when one or more SQE 196A are written to SQ 126. Accordingly, in this embodiment, one or more messages 190A may correspond and/or be identical, at least in part, to one or more SQE 196A.

Figure 6:
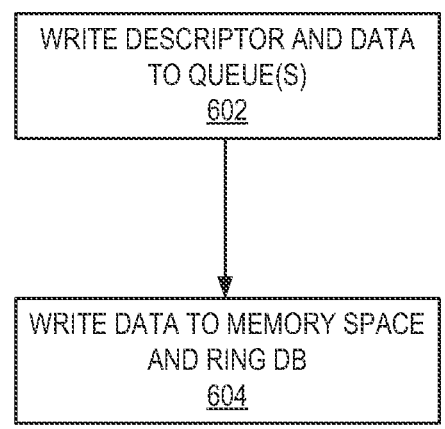
FIG. 6 illustrates features in an embodiment.

In order to signal controller 120 and/or RNIC 210 that the one or more messages 190A have been (or are being contemporaneously) written to one or more locations 206 in memory space 60, circuitry 118 (e.g., one or more HPC 12A and/or one or more drivers 33 executed by one or more HPC 12A) may write one or more doorbell messages 212A to one or more locations 208 via one or more write operations 204A (see operation 604 in FIG. 6). These one or more write operations 204A may involve one or more write-related transactions of the not shown host bus system in host 20, and may constitute a ringing of the one or more doorbells associated with the one or more locations 208. After being signaled that one or more messages 190A have been written to one or more locations 206 in memory space 60, controller 120 and/or RNIC 210 may determine whether sufficient resources contemporaneously exist and/or are available in controller 120 and/or RNIC 210 to permit the one or more I/O operations 132 to be executed. Controller 120 and/or RNIC 210 may make this determination based at least in part upon information contained in the one or more tracking tables 151 and/or resources that may be expected to be utilized if one or more RDMA commands embodied in and/or indicated by one or more descriptors 181A in one or more messages 190A are to be executed. In this embodiment, a resource may be, involve, specify, and/or comprise one or more physical, logical, and/or virtual (1) capabilities, facilities, functions, operations, portions of circuitry, and/or processes, and/or (2) permissions and/or scheduling to use such capabilities, facilities, functions, operations, portions of circuitry, and/or processes. If the controller 120 and/or RNIC 210 determine that insufficient resources exist and/or are presently available to permit controller 120 and/or RNIC 210 to be able to carry out one or more operations 132, controller 120 and/or RNIC 210 may discard one or more messages 190A. In this embodiment, the discarding of an entity may comprise the deleting and/or overwriting of the entity, and/or the indicating that the entity is available and/or amenable to be deleted and/or overwritten. Controller 120 and/or RNIC 210 may assign and/or track, at least in part, in one or more tables 151 the assignment of one or more resources of controller 120 and/or RNIC 210 to carry out the one or more operations 132 (and/or other RDMA operations) requested to be carried out by controller 120 and/or RNIC 210. If one or more messages 190A are discarded by controller 120 and/or RNIC 210, controller 120 and/or RNIC 210 may later execute one or more corresponding operations 132, as a result, at least in part, of subsequent processing of one or more SQE 196A.

Conversely, if controller 120 and/or RNIC 210 determine that sufficient of such resources exist to permit one or more operations 132 to be carried out, then controller 120 and/or RNIC 210 may execute one or more operations 132 requested by one or more messages 190A. In this case, controller 120 and/or RNIC 210 may not execute one or more operations 130 requested by one or more SQE 196A unless retransmission of data 199A is requested later by client 10 (e.g., in the event of error in the transmission of data 199A to client 10 via one or more operations 132 and/or in the receipt of such data 199A by client 10).

For example, in operation, in this embodiment, the HPC 12A . . . 12N may execute instructions that may result, at least in part, HPC 12A . . . 12N and/or one or more drivers 33 writing currently, at least in part, multiple respective messages 190A . . . 190N concurrently from memory 21 to memory space 60. Each of these messages 190A . . . 190N may comprise respective data 199A . . . 199N and a respective descriptor 181A . . . 181N. The respective data 199A . . . 199N may be comprised in the respective descriptors 181A . . . 181N that are comprised in the respective messages 190A . . . 190N. The respective descriptors 181A . . . 181N and/or messages 190A . . . 190N may request that the I/O controller 120 and/or NIC 210 execute respective RDMA transactions and/or operations to transfer and write respective data 199A . . . 199N into the not shown memory in client 10. This concurrent writing of messages 190A . . . 190N may be carried out using respective, single write operations 202A . . . 202N (e.g., involving respective write-related transactions of the not shown host bus system in host 20) to write respective data involving (e.g., in this case, from) respective WCB 214A . . . 214N associated with and/or generated by, at least in part, (e.g., respective) HPC 12A . . . 12N to one or more respective locations 206 in memory space 60. For example, WCB 214N may store, at least in part, data 199N that may be comprised in one or more messages 190N, and one or more messages 190N may be written to one or more respective locations 206 using write operation 202N. Prior to the writing of messages 190A . . . 190N to one or more respective locations 206, HPC 12A . . . 12N and/or one or more drivers 33 may write respective SQE 196A . . . 196N to SQ 126. The SQE 196A . . . 196N may request, at least in part, the execution by controller 120 and/or RNIC 210 of respective RDMA operations in the event of (1) respective discarding, at least in part, by the I/O controller 120 of respective messages 190A . . . 190N, and/or (2) respective retransmission of respective data 199A . . . 199N from controller 120 and/or RNIC 210 to client 10. In this embodiment, when written to one or more respective locations 206, the respective messages 190A . . . 190N may request, at least in part, execution by controller 120 and/or RNIC 210 of one or more respective RDMA I/O operations that may correspond and/or be identical (e.g., in substance and/or result), at least in part, to the one or more respective RDMA I/O operations that may be requested, at least in part, by respective SQE 196A . . . 196N when respective SQE 196A . . . 196N are written to SQ 126. Accordingly, in this embodiment, respective messages 190A . . . 190N may correspond and/or be identical, at least in part, to respective SQE 196A . . . 196N.

In order to signal controller 120 and/or RNIC 210 that the respective messages 190A . . . 190N have been written to one or more respective locations 206 in memory space 60, HPC 12A . . . 12N and/or one or more drivers 33 may write respective doorbell messages 212A . . . 212N to one or more respective locations 208 via respective write operations 204A . . . 204N. These respective write operations 204A . . . 204N may involve respective write-related transactions of the not shown host bus system in host 20, and may constitute respective ringing of respective doorbells associated with the one or more respective locations 208. After, contemporaneously, and/or prior to (at least in part) being signaled that respective messages 190A . . . 190N have been written to one or more respective locations 206 in memory space 60, controller 120 and/or RNIC 210 may make respective determinations of whether sufficient respective resources contemporaneously exist and/or are available in controller 120 and/or RNIC 210 (e.g., at or near the respective times that the respective doorbells are rung) to permit the respective RDMA I/O operations requested by the respective descriptors 181A . . . 181N and/or respective messages 190A . . . 190N to be executed. Controller 120 and/or RNIC 210 may make these respective determinations (e.g., at or near the respective times that the respective doorbells are rung) based at least in part upon information contained in the one or more tracking tables 151 and/or the respective resources that may be expected to be utilized if the respective RDMA commands embodied in and/or indicated by the respective descriptors 181A . . . 181N are to be executed.

If the controller 120 and/or RNIC 210 determine that insufficient respective resources exist and/or are available for execution of a respective message and/or respective descriptor, controller 120 and/or RNIC 210 may discard that respective message and/or respective descriptor. Controller 120 and/or RNIC 210 may assign and/or track, at least in part, in one or more tables 151 the assignment of respective resources of controller 120 and/or RNIC 210 to carry out the respective RDMA operations (and/or other operations) requested to be carried out by the controller 120 and/or RNIC 210 by the respective messages and/or respective descriptors. If a respective message is discarded by controller 120 and/or RNIC 210, controller 120 and/or RNIC 210 may later execute one or more corresponding RDMA operations requested by the respective corresponding SQE in SQ 126, as a result, at least in part, of subsequent processing of that respective corresponding SQE.

Conversely, if controller 120 and/or RNIC 210 determine that sufficient respective resources exist for execution of a respective message and/or respective descriptor, controller 120 and/or RNIC 210 may execute the one or more respective RDMA operations requested by that respective messages and/or respective descriptor. In this case, controller 120 and/or RNIC 210 may not execute the one or more respective corresponding RDMA operations requested by the respective corresponding SQE in SQ 126, unless subsequent retransmission of the respective data associated with that respective corresponding SQE is requested by client 10 (e.g., in the event of transmission and/or reception error involving that respective data).

In this embodiment, messages 190A . . . 190N may correspond to only a subset of the SQE in SQ 126. In the aggregate, this subset may consume less memory and/or request and/or implicate fewer total RDMA I/O-related operations than may be requested by the SQE in SQ 126 when taken in the aggregate. Advantageously, size of the memory space 60 may be reduced (e.g., compared to that which may be required if every SQE in SQ 126 had a corresponding respective SQE in SQ 126). Additionally or alternatively, in this embodiment, the size of memory space 60 may be defined, at least in part, by and/or with reference to the number of software entities (e.g., link processes) that may be granted concurrently granted write access to memory space 60. Advantageously, this may permit the size of memory space 60 to be related to the processing rate that is desired to be supported, and/or may permit the size of memory 60 to be substantially independent of the number and/or sizes of the send queues. The respective SQE 196A . . . 196N may comprise respective indications 110A . . . 110N of whether respective messages 190A . . . 190N are to be written (e.g., by HPC 12A . . . 12N and/or one or more drivers 33) to the one or more respective locations 206 in memory space 60 that may correspond, at least in part, to the respective SQE 196A . . . 196N. For example, if one or more messages (e.g., one or more messages 190A) are to be written to one or more locations 206 in memory 60 that correspond, at least in part, to one or more SQE (e.g., one or more SQE 196A) in SQ 126, then one or more indications 110A (e.g., included in and/or associated with those one or more SQE 196A) may so indicate. Conversely, if no message is to be written to one or more locations 206 in memory 60 that corresponds, at least in part, to a particular SQE (e.g., one or more SQE 196B) in SQ 126, then one or more indications 110B (e.g., included in and/or associated with those one or more SQE 196B) may so indicate.

After controller 120 and/or RNIC 210 completes a respective requested RDMA I/O operation, controller 120 and/or RNIC 210 provides to one or more drivers 33 and/or one or more of the HPC 12A . . . 12N a respective completion message. The respective completion message may include a respective indication of whether the respective RDMA I/O operation resulted from the execution of a respective SQE that corresponds to a respective message in memory space 60 that has been discarded. This information may be tracked (e.g., by HPC 12A ... 12N and/or one or more drivers 33) in CQ 302 in the form of respective completion queue elements (CQE) 124A ... 124N. For example, the respective CQE 124A ... 124N may include respective indications 165A ... 165N that may indicate such information. For example, if one or more respective I/O operations associated with one or more CQE 124B resulted from the execution of one or more respective SQE (e.g., one or more SQE 196B) that correspond to one or more respective messages (e.g., one or more message 190B) that had been written to memory space 60 but were discarded by controller 120 and/or RNIC 210, then one or more indicators 165B may so indicate. Conversely, if no such discarding occurred, then one or more indicators 165B may so indicate. Controller 120 and/or RNIC 210 may determine, at least in part, whether such discarding may have occurred based at least in part upon whether controller 120 and/or RNIC 210 executes a respective SQE (e.g., SQE 196A) that includes an indication that a corresponding message (e.g., message 190A) had been written to memory space 60, but which has not been executed. In this case, it is logical to assume that the corresponding message 190A was previously discarded by the controller 120 and/or RNIC 210, and the controller 120 and/or RNIC 210 may determine that such discarding has taken place.

In this embodiment, the default condition (subject to constraints described herein) may be that HPC 12A ... 12N and/or one or more drivers 33 may attempt to write to memory space 60 as many messages corresponding to SQE 196A ... 196N as possible. Accordingly, HPC 12A ... 12N and/or one or more drivers 33 may continue to attempt to write subsequent messages 190B (e.g., after writing one or more initial messages 190A) to memory space 60 unless and/or until (1) controller 120 and/or RNIC 210 have discarded one or more messages, and/or (2) no additional space remains available in one or more locations 206 to receive any additional message. After condition (1) and/or (2) have occurred, HPC 12A ... 12N and/or one or more drivers 33 may resume subsequent message writing after the SQ 126 becomes empty. This may be determined, for example, based upon whether any respective SQE is present in the SQ 126 that does not correspond to a respective CQE in CQ 302. Advantageously, in this embodiment, this opportunistic approach to directly pushing the messages 190A ... 190N to the memory space 60 may allow write-combining to be employed in a variety of different usage models, traffic flows, and/or environments, without reducing efficiency or undesirably increasing complexity. Further advantageously, in this embodiment, the respective performance of respective sets of operations by HPC 12A ... 12N and/or one or more drivers, on the one hand, and by controller 120 and/or RNIC 210, on the other hand, may proceed largely independently of each other. Advantageously, this substantial decoupling of these two respective sets of operations may permit each respective set to make largely independent forward processing progress without stalling the not shown system bus in the host 20, and without introducing substantial hardware-software flow control issues. Further advantageously, software processes may independently write messages to memory space 60 without coordinating their actions in this regard.

Figure 4:
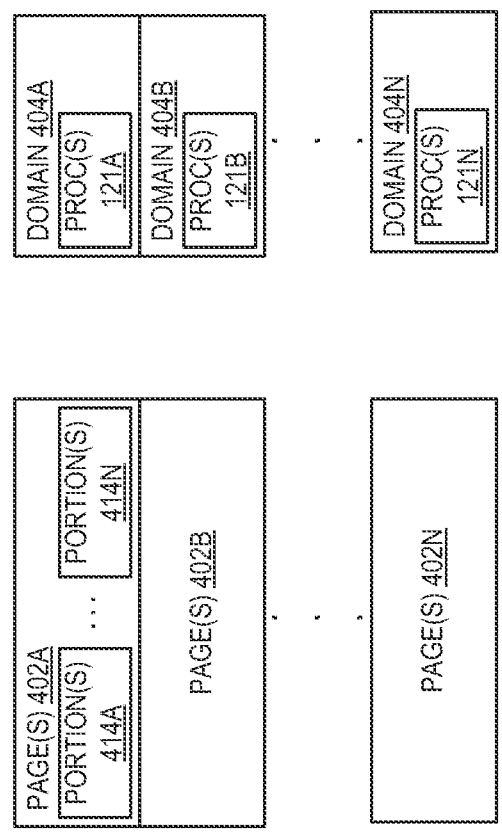
FIG. 4 illustrates features in an embodiment.

In this embodiment, processes 121A ... 121N may generate, at least in part, data that is to be transmitted via the RDMA operations to the client 10 and/or may initiate generation of requests for such data transmission. Accordingly, in order to facilitate secure and/or independent access by processes 121A ... 121N to memory space 60, the processes 121A ... 121N may belong to different respective security domains 404A ... 404N (see FIG. 4). For example, memory space 60 may comprise multiple respective pages 402A ... 402N to which the application processes 121A ... 121N may be assigned and/or mapped. In this arrangement, no two respective processes (e.g., processes 121A and 121B) that belong to different respective security domains (e.g., domains 404A and 404B, respectively) may share a single respective one of the pages 402A ... 402N, however, processes belonging to the same security domain may share one or more such pages. Thus, for example, a single respective page (e.g., page 402A) may not be mapped to two different respective processes (e.g., both to processes 121A and 121B). In this embodiment, respective data generated by, and/or one or more respective messages whose generation is initiated by a respective process, are to be written only to one or more respective pages belonging to and/or associated with the respective process and/or its respective security domain. For example, if data 199A was generated by, and/or the generation of one or more messages 190A was initiated, at least in part, by process 121A, then data 199A and/or one or more messages 190A may only be written to the one or more pages 402A in memory 60 that belong to and/or are associated with process 121A and/or security domain 404A, instead of other and/or additional pages (e.g., pages 402B ... 402N). Such secure access to assigned pages may be facilitated, at least in part, by the use of one or more respective secure references and/or handles to the respective pages that may be associated with, for example, respective queue pairs (QP) associated with the respective processes assigned to the respective pages.

Additionally, one or more of the pages (e.g., 402A) may comprise a plurality of portions 414A ... 414N. Each one of these respective portions (e.g., one or more portions 414A) may be to accommodate one or more respective messages (e.g., one or more messages 190A) to be written to these one or more respective portions 414A. In this embodiment, these one or more messages 190A may correspond to, for example, an entire respective queue element (e.g., SQE 196A). Advantageously, by dividing one or more pages 402A into multiple such portions 414A ... 414N multiple messages may be (e.g., contemporaneously) written to the same one or more pages 402A without acquiring a lock on the one or more pages 402A. Advantageously, the use of multiple security domains in the manner of this embodiment may permit multiple concurrent flows and/or may allow multiple software entities to be able to write concurrently to memory space 60 without the need to coordinate their access to memory space 60.

In this embodiment, a security domain may comprise one or more privileges and/or rights that may be associated with and/or belong to one or more entities that may belong to, be associated with, and/or be assigned to the security domain. Also in this embodiment, a page of memory may comprise one or more contiguous and/or non-contiguous memory locations.

Controller 120 and/or RNIC 210 may utilize one or more tracking tables 151 to track, at least in part, one or more assignments of one or more resources (e.g., shown symbolically by element 141 in FIG. 1) of the controller 120 and/or RNIC 210 to carry out one or more I/O operations (shown symbolically by element 133 in FIG. 1) that may be requested, at least in part, by one or more messages (e.g., one or more messages 190A). In this embodiment, a table may comprise one or more data structures and/or elements, including, but not limited to, those that may be tabular in nature. One or more tables 151 may be sufficiently large to permit concurrent tracking of the in-flight processing of multiple messages 190A ... 190N. The entries in one or more tables 151 may permit tracking of each incoming message written into memory space 60 by associating with the incoming message (1) its page index (e.g., specifying which of the pages 402A . . . 402N in which it is written), (2) offset within the indexed page, and/or (3) controller/RNIC resources assigned to carry out the incoming message. If an associated message already is being tracked in the one or more tables 151, one or more entries that may correspond to the associated message may be updated to include parameters associated with the incoming message. Conversely, if no such associated message is already being tracked, one or more new entries may be added (if sufficient resources exist) to track the incoming message. Further conversely, if insufficient resources exist (including, for example, insufficient tracking resources and/or resources associated with one or more tables 151) to permit the adding of one or more such new entries, then the incoming message may be discarded by the controller 120 and/or RNIC 210. Additionally, controller 120 and/or RNIC 210 may discard the incoming message (e.g., message 190A) unless, when controller 120 and/or RNIC 210 commences initial processing of the message 190A, a queue element (e.g., SQE 196A) that corresponds to the message 190A is currently at the head of the SQ 126. Advantageously, this may permit in order processing of messages 190A . . . 190N written to the memory space 60 with respect to SQE 196A . . . 196N. Also, if the incoming message 190A belongs to a flow control enabled and/or asserted class of traffic, the message 190A may be discarded, in order to reduce the amount of memory space 60 that might otherwise be allocated to store messages belonging to that class of traffic.

Also in this embodiment, the resources that may be tracked and/or assigned to an incoming message 190A by controller 120 and/or RNIC 210 may include, for example, allocation of transmission scheduling credits to the incoming message 190A, the data 199A, and/or to the operation 132. For example, in this embodiment, controller 120 and/or RNIC 210 may pre-allocate a subset 502 (see FIG. 5) of the total available number (and/or amount) 504 of transmission credits to a subset 505 of the total traffic 506 that is expected to be scheduled for transmission from host 20, controller 120, and/or RNIC 210 to client 10. This subset 502 may be predetermined, at least in part, and/or may be determined dynamically, at least in part. This subset 505 may be associated with and/or correspond to the traffic that is expected to result from execution of messages 190A . . . 190N. During and/or contemporaneous with, at least in part, the initial processing and/or tracking of the incoming message 190A (and/or of one or more resources assigned to carry out the one or more operations 132) by the controller 120 and/or RNIC 210, the controller 120 and/or RNIC 210 may determine, at least in part, whether a sufficient number 510 of unallocated credits exists in the subset 502 to allow transmission of the data 199A (e.g., via one or more operations 132) to occur. Controller 120 and/or RNIC 210 may discard the incoming message 190A if the controller 120 and/or RNIC 210 determines that the sufficient number 510 of unallocated credits does not exist (e.g., that an insufficient number of unallocated credits exists to allow the transmission of the data 199A). In this embodiment, a transmission credit may allocate, assign, indicate, provide, and/or imply permission, scheduling, and/or privilege associated, at least in part, with transmission. Advantageously, by appropriately selecting the number of credits in subset 502, and/or of the bandwidth and/or priority of traffic classes involved in this embodiment, undue discarding of incoming messages and/or stalling of message processing may be avoided, without substantially disrupting regularity of transmit scheduling.

Also advantageously, credit replenishment in this embodiment may be carried out using standard scheduling techniques, independently of the processing of messages 190A . . . 190N. In this embodiment, credits may be accumulated (e.g., up to a configurable limit), and if a number of pre-allocated credits falls below a configurable threshold, a not shown scheduler may request credit replenishment.

In this embodiment, the respective messages 190A . . . 190N and/or respective SQE 196A . . . 196N may comprise multiple respective processor cache lines (not shown). HP 12 may stall data in the WCB 214A . . . 214N, and a synchronization event may be used to flush them. Writing of the doorbells (e.g., using uncached memory in controller 120 and/or RNIC 210) may result in flushing of the WCB 214A . . . 214N. Alternatively, depending upon the construction and/or operation of HP 12, flushing of WCB 214A . . . 214N in connection with such stalling may not be utilized, without departing from this embodiment. However, in this embodiment, employing such uncached doorbell writes may permit flushing of the WCB 214A . . . 214N and may indicate transaction completion (e.g., in connection with flushing ordering and/or writing of the messages 190A . . . 190N to memory space 60). Also in this embodiment, although only a single QP (e.g., comprising CQ 302 and SQ 126) has been illustrated in the Figures, multiple respective QP may be employed and each such QP may be associated with respective messages that may be written to memory space 60.

Thus, an embodiment may include circuitry that may write a message from a system memory in a host to a memory space in an I/O controller in the host. A host operating system may reside, at least in part, in the system memory. The message may include both data and at least one descriptor associated with the data. The data may be included in the at least one descriptor. The circuitry also may signal the I/O controller that the writing has occurred. Advantageously, in this embodiment, no host system memory reads by the controller and/or RNIC in a host may be involved in carrying out an RDMA data transfer from the controller and/or RNIC to a client. Advantageously, this may substantially reduce the latency involved in the RDMA data transfer to the client. Further advantageously, in this embodiment, the RNIC resources that may be employed in connection with such messages may be dynamically managed and/or allocated (e.g., "on the fly" by RNIC hardware without host software involvement) without resulting in host bus interface stalling, and/or without substantial coordination of such hardware with host software.

Many other and/or additional modifications, variations, and/or alternatives are possible without departing from this embodiment. For example, although the I/O controller 120 has been primarily described in connection with network connectivity, communication, and/or control functionality, in addition or alternatively, controller 120 may comprise and/or be used in connection with storage (e.g., storage networking) functionality.

Other variations are also possible. For example, although not shown in the Figures, one or more tracking tables 151 and/or one or more resources 141 may be comprised, at least in part, in not shown private memory (e.g., not shown memory that may be comprised (e.g., on-chip and/or in local dynamic random access memory) in RNIC 210 and/or controller 120, and/or may be accessible by or inaccessible to one or more HP 12). Alternatively or additionally, one or more tracking tables 151 and/or one or more resources 141 may be comprised, at least in part, in memory 21 and cached, at least in part, in controller 120 and/or RNIC 210. Further alternatively or additionally, in order to advantageously permit an intended processing ordering of send queue elements to be preserved, RNIC 210 may process a given message only if that message is currently at the head of the message's corresponding send queue.

Many other variations also exist. Accordingly, this embodiment should be viewed broadly as encompassing such alternatives, modifications, and variations.

What is claimed is:

1. An apparatus comprising:
   circuitry to:
   write a message from a system memory in a host to a memory space in an input/output (I/O) controller in the host, a host operating system to reside, at least in part, in the system memory, the message including both data and at least one descriptor associated with the data, the data being included in the at least one descriptor, the memory space having a size that is based, at least in part, upon a number of software link process entities granted concurrent write access to the memory space; and
   signal the I/O controller that the writing has occurred.

2. The apparatus of claim 1, wherein:
   writing of the message to the memory space is carried out using a single write operation that involves a write-combined buffer associated with a host processor core; and
   the circuitry is also to write, prior to the writing of the message, a queue element to a queue, the queue element being to request, at least in part, execution by the I/O controller of an I/O operation involving the data in event of discarding of the message by the I/O controller, the I/O operation corresponding to another I/O operation to be requested, at least in part, by the writing of the message to the memory space.

3. The apparatus of claim 1, wherein:
   the host comprises host processor cores to execute instructions that result, at least in part, in multiple respective messages being written concurrently, at least in part, to the memory space, the respective messages each comprising respective data and a respective descriptor associated with the respective data, the respective data being included in the respective descriptor; and
   the I/O controller comprises a remote direct memory access (RDMA) network interface controller (NIC), the respective messages being to request execution by the RDMA NIC (RNIC) of respective RDMA transactions.

4. The apparatus of claim 1, wherein:
   the circuitry is also to write, prior to writing of the message to the memory space, a queue element to a send queue, the queue element being to request, at least in part, execution by the I/O controller of an I/O operation involving the data in event of either of occurrence of (1) discarding of the message by the I/O controller and (2) retransmission of the data; and
   the send queue includes a plurality of elements, each respective element in the plurality of elements in the send queue including a respective indication of whether a respective message corresponding, at least in part, to the respective element is to be written to the memory space by the circuitry, the respective message including respective data and a respective descriptor associated with the respective data, the respective descriptor including the respective data.

5. The apparatus of claim 4, wherein:
   the circuitry is to continue to write one or more subsequent messages to the memory space unless the discarding by the I/O controller occurs;
   after the discarding occurs, the circuitry to resume subsequent message writing after the send queue becomes empty; and
   the signaling comprises ringing at least one doorbell associated with the I/O controller.

6. The apparatus of claim 1, wherein:
   application processes are also to reside, at least in part, in the host memory;
   the memory space comprises multiple pages to which the processes are to be mapped;
   no two respective processes that belong to different respective security domains are to share a single respective one of the pages; and
   one or more of the pages comprise a plurality of portions, each respective portion being to accommodate at least one respective message to be written to the respective portion, the at least one respective message corresponding to an entire respective queue element and including respective data and a respective descriptor associated with the data.

7. The apparatus of claim 1, wherein:
   the I/O controller is to track, at least in part, assignment of one or more resources of the I/O controller to carry out one or more I/O operations requested, at least in part, by the message;
   if insufficient resources exist in the I/O controller to permit the one or more I/O operations to be carried out, the I/O controller is to discard the message; and
   the I/O controller is to discard the message unless, when the I/O controller processes the message, a queue element that corresponds to the message is currently at a head of a send queue, the queue element having been written to the queue prior to, at least in part, the message having been written to the memory space.

8. The apparatus of claim 7, wherein:
   the one or more I/O operations comprise transmission of the data;
   the I/O controller is to allocate a subset of a total available number of transmission credits to a subset of total traffic, the subset of the total traffic being associated, at least in part, with the transmission of the data;
   the I/O controller is to determine, contemporaneously at least in part with initial tracking of the one or more resources, whether a sufficient number of unallocated credits exists in the subset of the total number of transmission credits to allow the transmission; and
   the I/O controller is to discard the message if the I/O controller determines that the sufficient number of unallocated credits does not exist.

9. A method comprising:
   writing, by circuitry, a message from a system memory in a host to a memory space in an input/output (I/O) controller in the host, a host operating system to reside, at least in part, in the system memory, the message including both data and at least one descriptor associated with the data, the data being included in the at least one descriptor, the memory space having a size that is based, at least in part, upon a number of software link process entities granted concurrent write access to the memory space; and
   signaling, by the circuitry, the I/O controller that the writing has occurred.

10. The method of claim 9, wherein:
    the writing of the message to the memory space is carried out using a single write operation that involves a write-combined buffer associated with a host processor core; and the circuitry is also to write, prior to the writing of the message, a queue element to a queue, the queue element being to request, at least in part, execution by the I/O controller of an I/O operation involving the data in event of discarding of the message by the I/O controller, the I/O operation corresponding to another I/O operation to be requested, at least in part, by the writing of the message to the memory space.

11. The method of claim 9, wherein:
the host comprises host processor cores to execute instructions that result, at least in part, in multiple respective messages being written concurrently, at least in part, to the memory space, the respective messages each comprising respective data and a respective descriptor associated with the respective data, the respective data being included in the respective descriptor; and
the I/O controller comprises a remote direct memory access (RDMA) network interface controller (NIC), the respective messages being to request execution by the RDMA NIC (RNIC) of respective RDMA transactions.

12. The method of claim 9, wherein:
the circuitry is also to write, prior to the writing of the message to the memory space, a queue element to a send queue, the queue element being to request, at least in part, execution by the I/O controller of an I/O operation involving the data in event of either of occurrence of (1) discarding of the message by the I/O controller and (2) retransmission of the data; and
the send queue includes a plurality of elements, each respective element in the plurality of elements in the send queue including a respective indication of whether a respective message corresponding, at least in part, to the respective element is to be written to the memory space by the circuitry, the respective message including respective data and a respective descriptor associated with the respective data, the respective descriptor including the respective data.

13. The method of claim 12, wherein:
the circuitry is to continue to write one or more subsequent messages to the memory space unless the discarding by the I/O controller occurs;
after the discarding occurs, the circuitry to resume subsequent message writing after the send queue becomes empty; and
the signaling comprises ringing at least one doorbell associated with the I/O controller.

14. The method of claim 9, wherein:
application processes are also to reside, at least in part, in the host memory;
the memory space comprises multiple pages to which the processes are to be mapped;
no two respective processes that belong to different respective security domains are to share a single respective one of the pages; and
one or more of the pages comprise a plurality of portions, each respective portion being to accommodate at least one respective message to be written to the respective portion, the at least one respective message corresponding to an entire respective queue element and including respective data and a respective descriptor associated with the data.

15. The method of claim 9, wherein:
the I/O controller is to track, at least in part, assignment of one or more resources of the I/O controller to carry out one or more I/O operations requested, at least in part, by the message;
if insufficient resources exist in the I/O controller to permit the one or more I/O operations to be carried out, the I/O controller is to discard the message; and
the I/O controller is to discard the message unless, when the I/O controller processes the message, a queue element that corresponds to the message is currently at a head of a send queue, the queue element having been written to the queue prior to, at least in part, the message having been written to the memory space.

16. The method of claim 15, wherein:
the one or more I/O operations comprise transmission of the data;
the I/O controller is to allocate a subset of a total available number of transmission credits to a subset of total traffic, the subset of the total traffic being associated, at least in part, with the transmission of the data;
the I/O controller is to determine, contemporaneously at least in part with initial tracking of the one or more resources, whether a sufficient number of unallocated credits exists in the subset of the total number of transmission credits to allow the transmission; and
the I/O controller is to discard the message if the I/O controller determines that the sufficient number of unallocated credits does not exist.

17. Computer-readable memory storing one or more instructions that when executed by a machine result in performance of operations comprising:
writing, by circuitry, a message from a system memory in a host to a memory space in an input/output (I/O) controller in the host, a host operating system to reside, at least in part, in the system memory, the message including both data and at least one descriptor associated with the data, the data being included in the at least one descriptor, the memory space having a size that is based, at least in part, upon a number of software link process entities granted concurrent write access to the memory space; and
signaling, by the circuitry, the I/O controller that the writing has occurred.

18. The computer-readable memory of claim 17, wherein:
the writing of the message to the memory space is carried out using a single write operation that involves a write-combined buffer associated with a host processor core; and
the circuitry is also to write, prior to the writing of the message, a queue element to a queue, the queue element being to request, at least in part, execution by the I/O controller of an I/O operation involving the data in event of discarding of the message by the I/O controller, the I/O operation corresponding to another I/O operation to be requested, at least in part, by the writing of the message to the memory space.

19. The computer-readable memory of claim 17, wherein:
the host comprises host processor cores to execute instructions that result, at least in part, in multiple respective messages being written concurrently, at least in part, to the memory space, the respective messages each comprising respective data and a respective descriptor associated with the respective data, the respective data being included in the respective descriptor; and
the I/O controller comprises a remote direct memory access (RDMA) network interface controller (NIC), the respective messages being to request execution by the RDMA NIC (RNIC) of respective RDMA transactions.

20. The computer-readable memory of claim 17, wherein:
the circuitry is also to write, prior to writing of the message to the memory space, a queue element to a send queue, the queue element being to request, at least in part, execution by the I/O controller of an I/O operation involving the data in event of either of occurrence of (1) discarding of the message by the I/O controller and (2) retransmission of the data; and the send queue includes a plurality of elements, each respective element in the plurality of elements in the send queue including a respective indication of whether a respective message corresponding, at least in part, to the respective element is to be written to the memory space by the circuitry, the respective message including respective data and a respective descriptor associated with the respective data, the respective descriptor including the respective data.

21. The computer-readable memory of claim 20, wherein:
the circuitry is to continue to write one or more subsequent messages to the memory space unless the discarding by the I/O controller occurs;
after the discarding occurs, the circuitry to resume subsequent message writing after the send queue becomes empty; and
the signaling comprises ringing at least one doorbell associated with the I/O controller.

22. The computer-readable memory of claim 17, wherein:
application processes are also to reside, at least in part, in the host memory;
the memory space comprises multiple pages to which the processes are to be mapped;
no two respective processes that belong to different respective security domains are to share a single respective one of the pages; and
one or more of the pages comprise a plurality of portions, each respective portion being to accommodate at least one respective message to be written to the respective portion, the at least one respective message corresponding to an entire respective queue element and including respective data and a respective descriptor associated with the data.

23. The computer-readable memory of claim 17, wherein:
the I/O controller is to track, at least in part, assignment of one or more resources of the I/O controller to carry out one or more I/O operations requested, at least in part, by the message;
if insufficient resources exist in the I/O controller to permit the one or more I/O operations to be carried out, the I/O controller is to discard the message; and
the I/O controller is to discard the message unless, when the I/O controller processes the message, a queue element that corresponds to the message is currently at a head of a send queue, the queue element having been written to the queue prior to, at least in part, the message having been written to the memory space.

24. The computer-readable memory of claim 23, wherein:
the one or more I/O operations comprise transmission of the data;
the I/O controller is to allocate a subset of a total available number of transmission credits to a subset of total traffic, the subset of the total traffic being associated, at least in part, with the transmission of the data;
the I/O controller is to determine, contemporaneously at least in part with initial tracking of the one or more resources, whether a sufficient number of unallocated credits exists in the subset of the total number of transmission credits to allow the transmission; and
the I/O controller is to discard the message if the I/O controller determines that the sufficient number of unallocated credits does not exist.

* * * * *